(12) United States Patent
Homeyer et al.

(10) Patent No.: US 9,506,476 B2
(45) Date of Patent: Nov. 29, 2016

(54) OIL SUPPLY SYSTEM AND METHOD FOR SUPPLYING OIL FOR A TURBOPROP ENGINE

(75) Inventors: Christian Homeyer, Berlin (DE); Klaus Willenborg, Berlin (DE); Roland Fiola, Rangsdorf (DE)

(73) Assignee: Rolls-Royce Deutschland Ltd. & Co KG, Blankenfelde-Mahlow (DE)

( * ) Notice: Subject to any disclaimer, the term of this patent is extended or adjusted under 35 U.S.C. 154(b) by 714 days.

(21) Appl. No.: 14/002,914

(22) PCT Filed: Mar. 2, 2012

(86) PCT No.: PCT/EP2012/053635
§ 371 (c)(1),
(2), (4) Date: Oct. 16, 2013

(87) PCT Pub. No.: WO2012/117095
PCT Pub. Date: Sep. 7, 2012

(65) Prior Publication Data
US 2014/0050561 A1    Feb. 20, 2014

(30) Foreign Application Priority Data

Mar. 3, 2011  (DE) .................. 10 2011 012 976

(51) Int. Cl.
*F04D 29/06* (2006.01)
*F01D 25/20* (2006.01)
*F16N 7/40* (2006.01)

(52) U.S. Cl.
CPC .............. *F04D 29/06* (2013.01); *F01D 25/20* (2013.01); *F16N 7/40* (2013.01)

(58) Field of Classification Search
CPC ........... F04D 29/06; F01D 25/20; F16N 7/40
See application file for complete search history.

(56) References Cited

U.S. PATENT DOCUMENTS

| 1,464,828 A | * | 8/1923 | Parsons ............... F16N 7/40 |
| | | | 184/6.22 |
| 2,413,439 A | | 9/1941 | Drake |

(Continued)

FOREIGN PATENT DOCUMENTS

| DE | 4304482 | 8/1994 |
| GB | 658855 | 10/1951 |
| GB | 583888 | 12/1952 |

OTHER PUBLICATIONS

International Search Report and Written Opinion dated Jul. 11, 2012 from counterpart PCT/EP2012/053635.

(Continued)

*Primary Examiner* — Igor Kershteyn
*Assistant Examiner* — Eldon Brockman
(74) *Attorney, Agent, or Firm* — Shuttleworth & Ingersoll, PLC; Timothy Klima

(57) ABSTRACT

An oil supply system for a propeller turbine engine includes a first oil circuit for supplying the turbomachine and a second oil circuit for supplying the propeller gearbox and the high-pressure pump associated with a propeller adjusting device. The two oil circuits are integrated into a common oil tank and connected to one another by means of an oil supply line in the flow direction downstream of the first and the second oil conveying pumps in such a way that a limited oil volumetric flow can flow from the first oil circuit into the second oil circuit, and only in this direction, if the pressure difference between the first and the second oil circuits falls below a certain level in the event of a pressure reduction in the second oil circuit. In this way, a sufficiently high initial pressure of the oil is produced at the high-pressure pump, even at low propeller speeds and during transient propeller adjustment processes, so that the function of the propeller adjusting device is not impaired and the high-pressure pump is not damaged. Limiting the oil volumetric flow in the oil supply line connecting the two oil circuits prevents that the turbomachine is inadequately supplied with oil, while oil is being removed from the first oil circuit.

13 Claims, 1 Drawing Sheet

(56) References Cited

U.S. PATENT DOCUMENTS

| | | | |
|---|---|---|---|
| 2,338,483 A | 1/1944 | Beebe, Jr. | |
| 4,899,850 A * | 2/1990 | Koller | F01D 25/20 184/27.2 |
| 5,769,182 A * | 6/1998 | Parenteau | F16N 7/40 184/104.1 |
| 6,886,324 B1 * | 5/2005 | Handshuh | F02C 7/06 60/39.08 |
| 7,118,336 B2 * | 10/2006 | Waddleton | B64C 11/38 184/6.12 |
| 7,172,391 B2 * | 2/2007 | Carvalho | B64C 11/38 416/1 |
| 2005/0135929 A1 * | 6/2005 | Waddleton | B64C 11/38 416/1 |
| 2008/0110596 A1 * | 5/2008 | Schwarz | F01D 25/08 165/104.11 |
| 2008/0196974 A1 * | 8/2008 | Galivel | F01D 25/20 184/6.4 |
| 2011/0030385 A1 | 2/2011 | Ellans et al. | |

OTHER PUBLICATIONS

Translation of International search Report dated Jul. 11, 2012 from counterpart PCT/EP2012/053635.

* cited by examiner

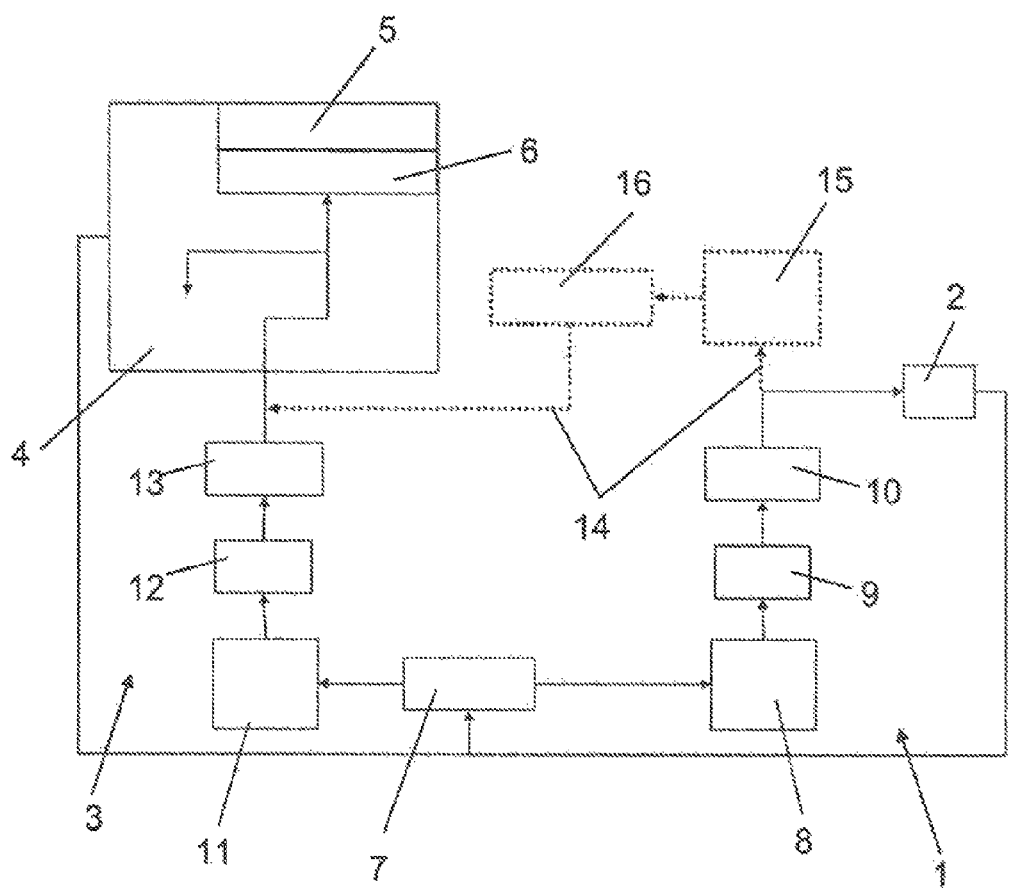

OIL SUPPLY SYSTEM AND METHOD FOR SUPPLYING OIL FOR A TURBOPROP ENGINE

This application is the National Phase of International Application PCT/EP2012/053635 filed Mar. 2, 2012 which designated the U.S.

This application claims priority to German Patent Application No. DE102011012976.6 filed Mar. 3, 2011, which application is incorporated by reference herein.

This invention relates to an oil supply system for a propeller turbine engine, including a first oil circuit for supplying the turbomachine and a second oil circuit for supplying the propeller system.

A propeller turbine engine (turboprop engine, propfan engine, propeller engine) consists substantially of a turbomachine including a compressor, a combustion chamber and a turbine, and at least one propeller driven via a propeller gearbox and connected to a propeller adjusting device for altering the pitch angle of the propeller blades. Propeller engines are usually equipped with two oil circuits separate from one another. Oil is supplied to the turbomachine via a first oil circuit, in which the oil circulates from an oil tank via a first oil conveying pump (turbomachine pump), a first oil filter, a first oil cooler and the bearings and gearbox components of the turbomachine back to the oil tank. In a second oil circuit provided for supplying oil to the propeller system are integrated an oil tank, a second oil conveying pump (propeller main pump) coupled to the propeller shaft, a second oil filter, a second oil cooler, and the propeller gearbox supplied with part of the oil quantity delivered, as well as a high-pressure pump (propeller high-pressure pump) connected to the propeller adjusting device and supplied with a further part of the oil quantity delivered, for generating the pressure necessary for adjusting the propeller blades.

The previously described oil supply system is disadvantageous to the extent that in the second oil circuit, under certain conditions, the oil supply to the high-pressure pump and hence the initial pressure of the oil at the high-pressure pump are too low, so that the propeller adjusting device is undersupplied and its function of achieving a required pitch angle of the propeller blades is restricted and, furthermore, damage to the high-pressure pump can occur. Too low an oil flow and a correspondingly low initial pressure of the oil at the high-pressure pump (propeller high-pressure pump) is due on the one hand to the fact that the second oil conveying pump (propeller main pump) coupled to the propeller shaft builds up too low a pressure at a low propeller speed. Moreover, when there is a change in the engine power or propeller speed a transient propeller adjustment manoeuvre can cause the required oil volume flow of the high-pressure pump to rise steeply, so that the initial pressure of the oil at the high-pressure pump is less than the required pressure, and hence only a low control pressure insufficient for the requirements of adjusting the propeller blades is available. A negative pressure created under these circumstances in the high-pressure pump in conjunction with the large oil quantity needed for propeller blade adjustment and causing vapour bubble formation can lead to the previously mentioned damage to the high-pressure pump and considerably shorten its service life. To avoid these drawbacks, it has already been proposed that the oil conveying pump in the second oil circuit be enlarged, which however entails a weight increase and unwelcome power losses.

The object underlying the present invention is to design an oil supply system consisting of two separate oil circuits for a propeller turbine engine such that the required initial pressure of the oil is applied to the high-pressure pump provided for controlling propeller blade adjustment, for ensuring operation of the propeller blade adjusting device and a long service life of the high-pressure pump, while avoiding power losses and additional weight.

In accordance with the invention, a solution is provided by an oil supply system and a method in accordance with features described herein. Advantageous developments will become apparent from the present description.

The basic idea of the invention is that the two separate oil circuits each provided for supplying oil to the turbomachine, to the propeller gearbox and to the high-pressure pump associated with a propeller adjusting device are connected to one another in the flow direction downstream of the first and second oil conveying pumps via an oil supply line, such that a limited oil volumetric flow can pass from the first oil circuit into the second oil circuit, and only in this direction, if in the event of a pressure reduction in the second oil circuit, the pressure difference between the first and the second oil circuits falls below a certain level, with the first and the second oil circuits being connected to a common oil tank. In this way, a sufficiently high initial pressure of the oil is produced at the high-pressure pump, even at low propeller speeds and during transient propeller adjustment processes, so that the function of the propeller adjusting device is not impaired and the high-pressure pump is not damaged. Limiting the oil volumetric flow in the oil supply line connecting the two oil circuits prevents that the turbomachine is inadequately supplied with oil, while oil is being withdrawn from the first oil circuit.

The oil supply from the first oil circuit to the second one is released by a valve, preferably a non-return valve, incorporated into the oil supply line and opening due to the pressure difference only in the direction of the second oil circuit.

For limiting the size of the oil volumetric flow diverted from the first oil circuit, a flow limiter preferably designed as a diaphragm is incorporated into the oil supply line.

The method in accordance with the invention provides for an oil supply to the propeller engine, by means of a first oil circuit for the turbomachine and of a second oil circuit for the propeller gearbox and a propeller adjusting device supplied by a high-pressure pump, from a common oil tank, with a limited oil volumetric flow being routed from the turbomachine oil circuit into the propeller oil circuit when the initial pressure of the oil at the high-pressure pump is below a predetermined level.

An exemplary embodiment of the invention is explained in greater detail on the basis of the drawing, the sole FIGURE of which representing, as a block diagram, an oil supply system including two oil circuits for a turboprop engine.

The oil supply system includes a first oil circuit 1 (turbomachine circuit) for supplying oil to the gearbox and bearings of a turbomachine 2, and a second oil circuit 3 (propeller circuit) for supplying a defined oil quantity for bearing lubrication and cooling of a propeller gearbox 4 connected to the propeller (not shown) and driven by the turbomachine 2 via a drive shaft (not shown), and for providing a further oil quantity and generating a predetermined initial pressure of the oil for a high-pressure pump 6 connected to an hydraulically operated propeller adjusting device 5. A common oil tank 7 is incorporated into the first and second oil circuits 1, 3, from which tank the oil is passed by means of a first oil conveying pump 8 (turbomachine pump) arranged in the first oil circuit 1 via a first oil filter 9 and a first oil cooler 10 to the turbomachine 2 and from there back into the oil tank 7. By means of a second oil conveying pump 11 (propeller main pump) arranged in the second oil circuit 3, oil is conveyed from the common oil tank 7 via a second oil filter 12 and a second oil cooler 13 to the propeller gearbox 4 and to the high-pressure pump 6, and then flows back into the common oil tank 7.

The first and second oil circuits 1, 3 are connected to one another downstream of the first and second oil conveying pumps 8, 11 in this case downstream of the first and second oil coolers 10, 13 and upstream of the turbomachine 2 and/or the propeller gearbox 4 and the high-pressure pump 6 via an oil supply line 14. A valve 15 (non-return valve) and a flow limiter 16 (diaphragm) are incorporated into the oil supply line 14 such that a limited quantity of the oil conveyed by the first oil conveying pump 8 in the first oil circuit 1 can additionally enter the second oil circuit 3, to ensure the required level for the initial pressure of the oil at the high-pressure pump 6.

The valve 15 is designed such that an oil flow is only possible from the first oil circuit 1 to the second oil circuit 3, and on no account in the opposite direction, as otherwise the propeller gearbox 4 and the high-pressure pump 6 might be supplied with oil to an even lesser extent. In addition, the non-return valve 15 opens only when there is a predetermined pressure difference between the first oil circuit 1 (turbomachine oil circuit) and the second oil circuit 3 (propeller oil circuit), so that additional oil can pass into the second oil circuit 3 only in this case and can raise a too-low initial pressure of the oil to the required level. On the other hand, however, the volume of oil flowing through the opened valve 15 into the second oil circuit is limited by a flow limiter 16 integrated into the connecting line 14 in order to prevent undersupply of the turbomachine due to excessive oil removal.

LIST OF REFERENCE NUMERALS

1 First oil circuit (turbomachine oil circuit)
2 Turbomachine
3 Second oil circuit (propeller oil circuit)
4 Propeller gearbox
5 Propeller adjusting device
6 High-pressure pump of 5
7 Common oil tank
8 First oil conveying pump (turbomachine pump)
9 First oil filter
10 First oil cooler
11 Second oil conveying pump (propeller main pump)
12 Second oil filter
13 Second oil cooler
14 Oil supply line between 1 and 3
15 Valve in 14
16 Flow limiter in 14

What is claimed is:

1. A turboprop engine, comprising:
a turbomachine,
a propeller gearbox,
a propeller driven by the turbomachine via the propeller gearbox,
a propeller adjusting device associated with the propeller for adjusting the propeller,
a high-pressure pump associated with the propeller adjusting device for driving the propeller adjusting device,
a first oil circuit;
an oil conveying pump integrated into the first oil circuit for supplying the turbomachine,
a second oil circuit,
a second oil conveying pump integrated into the second oil circuit for supplying the propeller gearbox and the high-pressure pump,
an oil supply line;
wherein the first and the second oil circuits are connected in a flow direction downstream of the first and the second oil conveying pumps via the oil supply line for passing a limited oil volumetric flow from the first oil circuit into the second oil circuit, if, in an event of a pressure reduction in the second oil circuit, a magnitude of a pressure difference between the first and the second oil circuits rises above a certain level,
wherein the first and the second oil circuits are connected to a common oil tank.

2. The turboprop engine supply system in accordance with claim 1, and further comprising a valve integrated into the oil supply line which opens in a direction of the second oil circuit, when the magnitude of the pressure difference between the first and the second oil circuits rises above the certain level.

3. The turboprop engine supply system in accordance with claim 2, wherein the valve is a non-return valve.

4. The turboprop engine supply system in accordance with claim 3, and further comprising a flow limiter integrated into the oil supply line for limiting the oil volumetric flow withdrawn from the first oil circuit.

5. The turboprop engine supply system in accordance with claim 4, wherein the flow limiter is a diaphragm.

6. The turboprop engine supply system in accordance with claim 5, and further comprising a first oil filter and a second oil filter as well as a first oil cooler and a second oil cooler respectively integrated into the first and the second oil circuits in the flow direction downstream of the first oil conveying pump and the second oil conveying pump.

7. The turboprop engine supply system in accordance with claim 1, and further comprising a flow limiter integrated into the oil supply line for limiting the oil volumetric flow withdrawn from the first oil circuit.

8. The turboprop engine supply system in accordance with claim 7, wherein the flow limiter is a diaphragm.

9. The turboprop engine supply system in accordance with claim 8, and further comprising a first oil filter and a second oil filter as well as a first oil cooler and a second oil cooler respectively integrated into the first and the second oil circuits in the flow direction downstream of the first oil conveying pump and the second oil conveying pump.

10. The turboprop engine supply system in accordance with claim 7, and further comprising a first oil filter and a second oil filter as well as a first oil cooler and a second oil cooler respectively integrated into the first and the second oil circuits in the flow direction downstream of the first oil conveying pump and the second oil conveying pump.

11. The turboprop engine supply system in accordance with claim 1, and further comprising a first oil filter and a second oil filter as well as a first oil cooler and a second oil cooler respectively integrated into the first and the second oil circuits in the flow direction downstream of the first oil conveying pump and the second oil conveying pump.

12. A method for supplying oil to a propeller engine, comprising:
supplying oil via a first oil circuit to a turbomachine;
supplying oil via a second oil circuit to a propeller gearbox and a propeller adjusting device supplied by a high-pressure pump,
integrating the two oil circuits into a common oil tank, and routing a limited oil volumetric flow from the first oil circuit into the second oil circuit when an initial pressure of the oil at the high-pressure pump falls below a predetermined level.

13. The method for supplying oil to a propeller engine in accordance with claim 12, and further comprising:

routing the limited oil volumetric flow from the first oil circuit into the second oil circuit when a magnitude of a pressure difference between the first and the second oil circuits rises above a certain level.

* * * * *